United States Patent [19]

Kasama et al.

[11] 4,272,838
[45] Jun. 9, 1981

[54] ELECTRONIC WATCH MODULE STRUCTURE

[75] Inventors: Noriyuki Kasama, Hino; Singo Ichikawa, Tanashi, both of Japan

[73] Assignee: Citizen Watch Co., Ltd., Tokyo, Japan

[21] Appl. No.: 22,252

[22] Filed: Mar. 20, 1979

[30] Foreign Application Priority Data

| Mar. 22, 1978 | [JP] | Japan | 53/032556 |
| Mar. 22, 1978 | [JP] | Japan | 53/032558 |
| Apr. 17, 1978 | [JP] | Japan | 53/044181 |
| Jun. 23, 1978 | [JP] | Japan | 53/076200 |
| Jun. 23, 1978 | [JP] | Japan | 53/086138[U] |
| Jun. 23, 1978 | [JP] | Japan | 53/086139 |
| Jun. 28, 1978 | [JP] | Japan | 53/077408 |
| Jul. 18, 1978 | [JP] | Japan | 53/087592 |

[51] Int. Cl.³ .............. G04C 23/02; G04B 37/00; G04C 19/00; G04C 17/00
[52] U.S. Cl. .............................. 368/88; 368/84; 368/242; 368/276
[58] Field of Search ............ 58/90 R, 88 R, 50 R, 58/88 B, 23 B, 23 A; 350/345; 368/276, 281, 220, 242, 88, 84

[56] References Cited

U.S. PATENT DOCUMENTS

| 3,863,436 | 2/1975 | Schwartzschild et al. | 58/50 R |
| 3,983,689 | 10/1976 | Burke et al. | 58/50 R |
| 3,994,564 | 11/1976 | Somogyi | 350/345 |
| 4,031,341 | 6/1977 | Wuthrich et al. | 200/52 R |
| 4,041,213 | 8/1977 | Schneider | 429/98 |

Primary Examiner—Gene Z. Rubinson
Assistant Examiner—John B. Conklin
Attorney, Agent, or Firm—Jordan and Hamburg

[57] ABSTRACT

An electronic watch module structure adapted to be disposed and supported by a case body of the watch. The module structure comprises a plastic base which has a first axial recess formed on one side of the plastic base, a second axial recess formed on the other side of the plastic base, a circuit board disposed in the first axial recess, an electro-optical display cell disposed on one side of the circuit board, and retaining means for retaining the display cell in a fixed place relative to the circuit board.

53 Claims, 8 Drawing Figures

ELECTRONIC WATCH MODULE STRUCTURE

This invention relates to an electronic timepiece and, more particularly, to a module structure for such timepiece.

A watch case for an electronic timepiece generally has a waterproof structure to protect the electronic circuitry and associated components and must be provided with a waterproof packing for such portions as the watchglass, push-buttons and back cover. The conventional structure of this type is therefore complicated and requires that parts be machined to a high precision. In addition, watch cases must commonly be provided in a wide variety of shapes for diversification of design even though the timepiece movement itself remains unchanged. Ensuring the waterproof condition of each of these multifarious watch case designs has required a great amount of labor for management and inspection so that it has been difficult to hold down costs. It is therefore an object of the present invention to provide an electronic wristwatch module structure which eliminates the abovementioned shortcomings encountered in the prior art.

It is another object of the present invention to provide an electronic wristwatch module structure which readily ensures a waterproof condition and allows the simplification of a watch case structure by waterproofing a plastic base adapted to accommodate various components such as a circuit board and battery.

It is a further object of the present invention to provide an electronic wristwatch module structure capable of being manufactured at low cost and which can be made extremely slender by making it possible to unify the plastic base and the back cover of the watch case into a single structure.

These and other objects, features and advantages of the present invention will become more apparent from the following description when taken in conjunction with the accompanying drawings, in which.

Figure 1A:
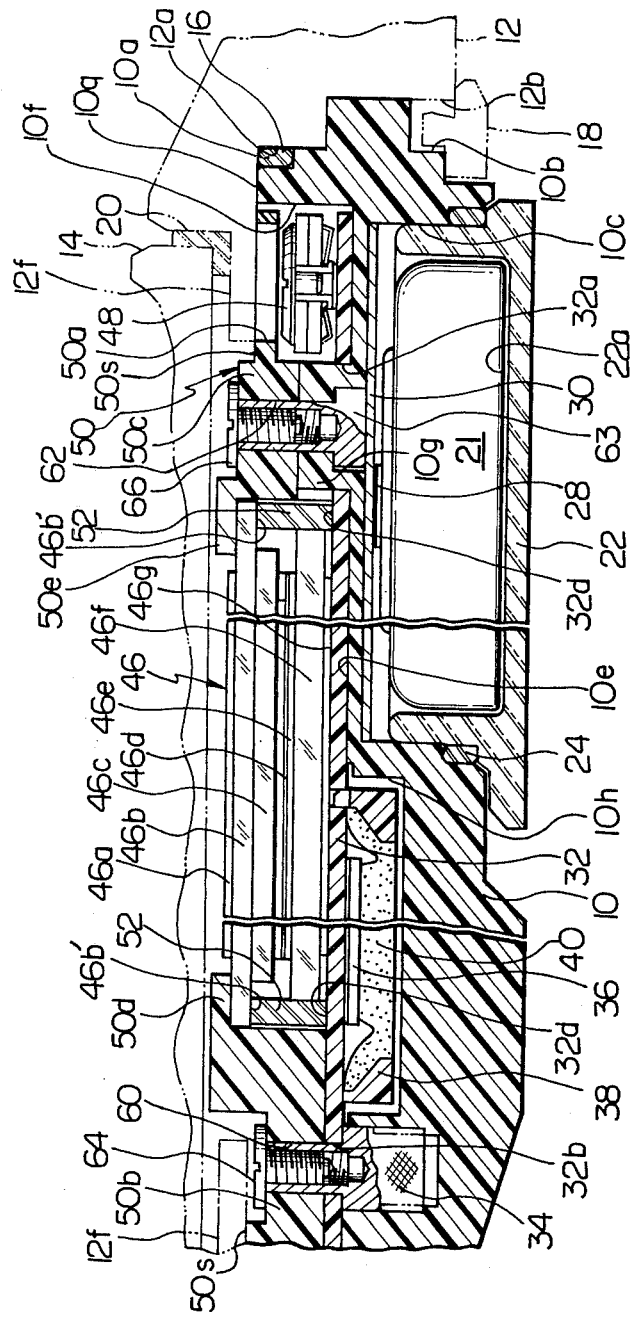
FIGS. 1A and 1B are sectional views of a preferred embodiment of a module structure for an electronic timepiece according to the present invention.
Figure 1B:
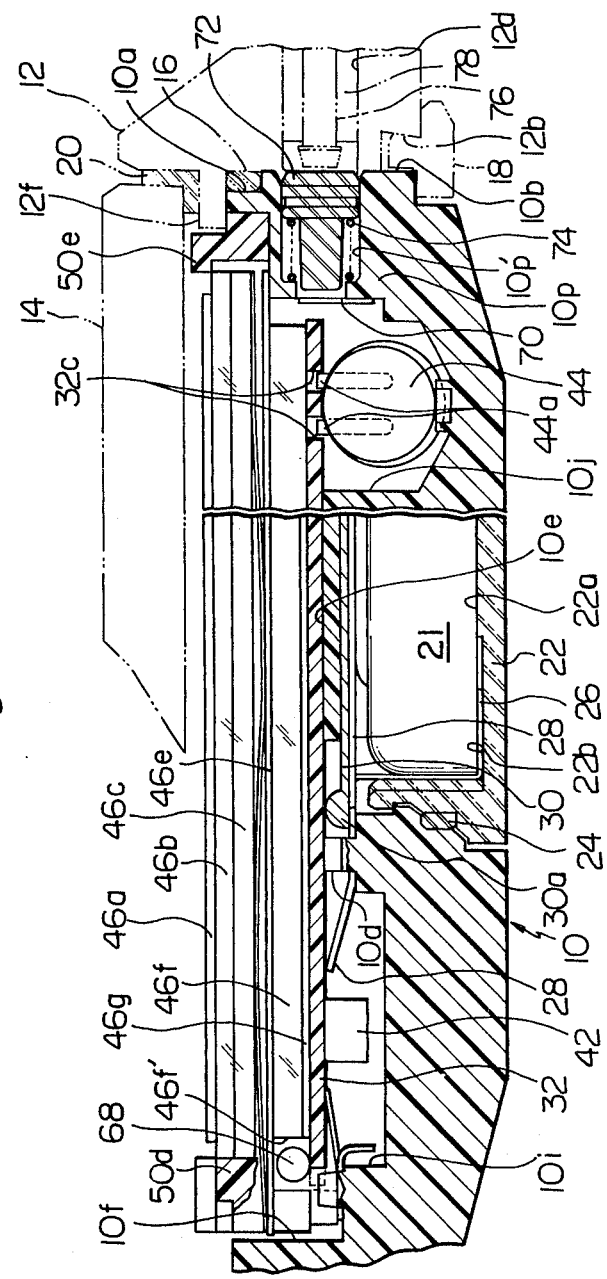

Referring now to FIGS. 1A and 1B, there is shown a plan view of a preferred embodiment of an electronic wristwatch module structure embodying the present invention. The module structure is shown as comprising a plastic base 10 supported by a case body 12 and having a flange 12f, which carries a watch glass 14. The plastic base is a single body serving as a substrate and a back cover of the watch. The plastic base 10 has its upper portion formed with an axial wall 10a radially spaced from an axial wall 12a of the case body 12, to provide a space therebetween to accommodate a sealing ring or packing 16. The plastic base has its one side engaging with the flange 12f of the case body. The packing 16 provides a water-proofing effect. The plastic base 10 also has its lower portion formed with an axial wall 10b radially spaced from an axial wall 12b of the case body 12 to provide a space therebetween to accommodate a second sealing ring or packing 18, to prevent water from leaking into interior of the module structure. Indicated at 20 is a packing which is compressed between the watch glass 14 and the case body 12 to provide a water-proofing effect therebetween. The lower portion of the plastic base 10 serves as a back cover and has a battery compartment or cutout 10c in which a battery cell 21 is accommodated. A battery cap or hatch 22 is fitted into the cutout 10c of the plastic base 10 and has an axially indented recess 22a in which a major part of the battery cell 21 is disposed. A sealing ring 24 is disposed between the cutout 10c of the plastic base 10 and the battery cap 22 to provide a water-proofing effect therebetween.

As best shown in FIG. 1B, the recess 22a of the battery cap 22 has its bottom wall formed with a stepped portion 22b, to provide a space between the positive side of the battery cell 21 and the stepped portion 22b between which a positive electrode plate 26 is held in electrical contact with the positive side of the battery cell 21. A battery seating spring 28 is positioned in a fixed place by means of an axial stud 10d formed on upper side of the plastic base 10 and extends toward the negative side of the battery cell 21 in electrical contact therewith. A negative electrode plate 30 is held in electrical contact with the seating spring 28 and has an embossed portion 30a held in electrical contact with an electrically conductive pattern formed on a lower side of a circuit board 32.

As best shown in FIG. 1A, an upper side of the plastic base 10 has an axially extending recess 10f and a radially extending wall portion 10e formed at the bottom of the recess 10f. The circuit board 32 is placed on the radially extending wall portion 10e of the plastic base 10. The circuit board 32 has an axial bore 32a through which an embossed portion 10g extends, to hold the circuit board 32 in a fixed, correct position. The circuit board 32 also has an axial bore 32b through which a portion of a connecting tube 34 embedded into the plastic base 10 extends upward for a reason as will be subsequently described. The radial wall portion 10e of the plastic base 10 is formed with a cutout 10h. An integrated circuit chip 36 is mounted on a lower surface of the circuit board 32 and electrically connected to a conductive circuit pattern formed on the lower surface of the circuit board 32 by wiring. A flow blocking frame 38 is disposed around the integrated circuit chip 36 to block the flow of resin mold 40 during a molding process.

As shown in FIG. 1B, the radial wall portion 10e of the plastic base 10 also has an axially extending recess 10i in which an output capacitor 42 is accommodated, with the capacitor 42 being mounted on the lower surface of the circuit board 32 and electrically connected to the conductive pattern formed on the lower surface of the circuit board. The radial wall portion 10e of the plastic base 10 further has an axially extending recess 10j in which a quartz crystal vibrator 44 is disposed and supported by a bottom wall of the recess 10j. The vibrator 44 has two electrodes 44a serving as connector pins, upper ends of which extend through bores 32c of the circuit board 32 and fixedly supported by the bores 32c. The vibrator 44 is electrically connected to the conductive pattern formed on the lower surface of the circuit board 32 to provide a frequency standard signal to the integrated circuit chip 36 (see FIG. 1A), which is responsive to the frequency standard signal to provide a drive signal to drive a liquid crystal display cell 46 to provide a display of time information. A trimming capacitor 48 is mounted on an upper surface of the circuit board 32 and trimming of the capacitor 48 is performed through a bore 50a of a display cell retaining frame 50.

As best shown in FIG. 1A, the display cell retaining frame is disposed in the first axial recess 10f of the plastic base 10 to retain the liquid crystal display cell 46 in a fixed place within the recess 10f. The retaining frame 50 has a shoulder 50s which abuts against a radial flange 12f of case body 12. The plastic base 10 has its upper side 10q engaging with a radial wall of case body 12. The display cell 46 comprises an upper polarizing plate 46a, an upper glass substrate 46b, a lower glass substrate 46c spaced apart from the upper glass substrate 46b to provide a space therebetween to accommodate a liquid crystal display material, a polarizing spacer 46d, a lower polarizing plate 46e, a light transmissive plate 46f, and a reflecting plate 46g. The upper glass substrate 46b has its lower surface formed with rows of printed electrode terminals 46b', which are electrically connected to corresponding printed electrode terminals 32d of the circuit board 32 by means of electrically conductive rubber connectors 52 compressed between the upper glass substrate 46b and the circuit board 32. Thus, the drive signal is delivered from the integrated circuit chip 36 to the display cell 46 through the connectors 52. The display cell retaining frame is made of a plastic material and has first and second radial wall portions 50b and 50c. The first radial wall portion 50b is disposed on the circuit board 32 and has an axial bore 60 to which an upper portion of the connector tube 34 is fitted. A screw 64 is screwed into the connector tube 34 to fixedly retain the radial wall portion 50b of the cell retaining frame 50. The second radial wall 50c is disposed on the embossed portion 10g of the plastic base 10 and has an axial bore 62. A connector tube 63 is embedded in the embossed portion 10g of the plastic base 10 and extends through the axial bore 62 of the second radial wall portion 50c. A screw 66 is screwed into the connector tube 63, to fixedly retain the second radial wall 50c in place. The cell retaining frame 50 also has first and second radial flanges 50d and 50e integral with the radial wall portions 50b and 50c, respectively. The flanges 50d and 50e engage with the upper surface of the upper glass 46b of the display cell 46, to hold the display cell 46 in a fixed place.

As shown in FIG. 1B, the light transmissive plate 46f has a cutout 46f' in which an illuminating lamp 68 is disposed. The plastic base 10 has an axial wall 10p to an inner wall of which is disposed a switch contact 70. The radial wall 10p has an axially extending stepped bore 10p' into which an intermediate switch member 72 is slidably fitted. The intermediate switch member 72 is made of an elastic material such as rubber or plastic and provides a sealing effect between the outer periphery of the switch member 72 and the stepped bore 10p' to provide water-proofing effect. Indicated as 74 is a compression spring which serves as means for holding the switch member 72 at a position away from the contact 70. The case body 12 is shown as having a radial bore 12d in which a bearing 78 is disposed. The bearing 78 slidably supports a push-button 76 substantially concentric with the intermediate switch member 72, to radially move the switch member 72 toward the contact 70.

During assembly, the circuit board 32 having its lower surface mounted with the integrated circuit chip 36 is disposed in the recess 10f of the plastic base 10 and placed on the radial wall 10e. Next, the display cell 46 is placed on the circuit board 32 and the conductive rubber members 52 are disposed between the upper glass 46b of the display cell 46 and the circuit board 32. The cell retaining frame 50 is then placed above the circuit board 32 such that the first wall portion 50b is in contact with the circuit board 32 and the second wall portion 50c is disposed on the upper end face of the embossed portion 10g of the plastic base 10. Screws 64 and 66 are screwed into the corresponding connector tubes 34 and 63 to fixedly retain the retaining frame 50 in a fixed place. It will thus be seen that with the arrangement mentioned above since various components such as the circuit board 32, the display cell 46 and the cell retaining frame 50 can be assembled from one side of the plastic base 10, i.e., from upward of the plastic base 10, the time required for assembly can be remarkably reduced and the movement structure having a simplified construction can be obtained.

Figure 1C:
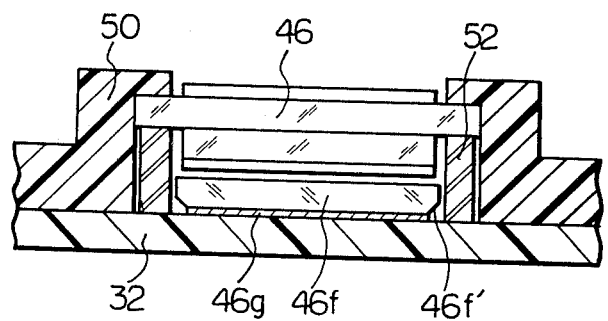
FIG. 1C is a cross sectional view of a modified form of the module structure shown in FIG. 1A.

FIG. 1C shows a portion of a modified form of the module structure shown in FIG. 1A, with like parts bearing the same reference numerals as those used in FIG. 1A. In this modification, the light transmissive plate 46f has chamfered edges 46f' and the reflecting layer 46g whose outer periphery has a size smaller than that of the light transmissive plate 46f, to prevent short-circuiting between the circuit pattern of the circuit board 32 and the conductive rubber members 52.

Figure 1D:
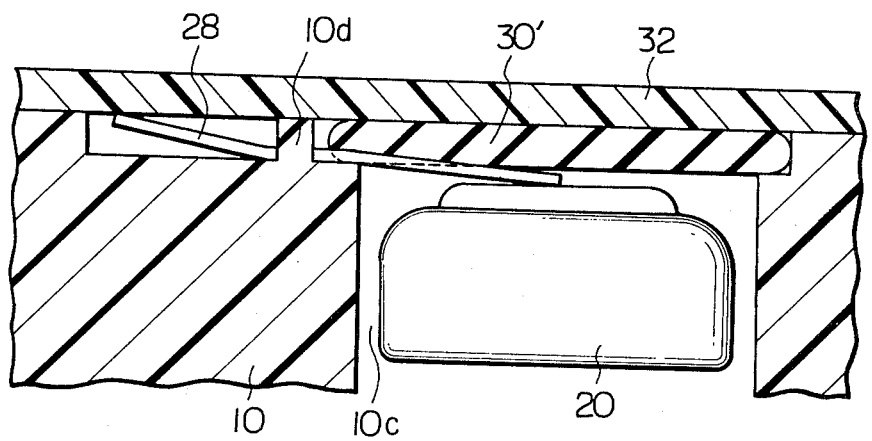
FIG. 1D is a cross sectional view of another modified form of the module structure shown in FIG. 1B.

FIG. 1D shows still another modification of a module structure shown in FIG. 1B. In this modification, the spring 30 is replaced with an elastic seat member 30' made of plastic or rubber material, to provide a water-proofing effect between the compartment 10c and the circuit board 32. This prevents the electrolyte leaked from the battery 20 from passing to the circuit board 32 and other components parts. Another advantage is that since the lead terminal 28 is compressed against the plastic base 10 and the lead terminal 28 is positioned by the boss portion 10d, the lead terminal 28 is fixed in place without heat cauking. Thus, assembling and disassembling of the lead terminal 28 can be easily performed within a short period. Thus, if the lead terminal 28 is damaged due to the electrolyte leaked from the battery 20, then the damaged lead terminal 28 is easily replaced with new one.

Figure 2:
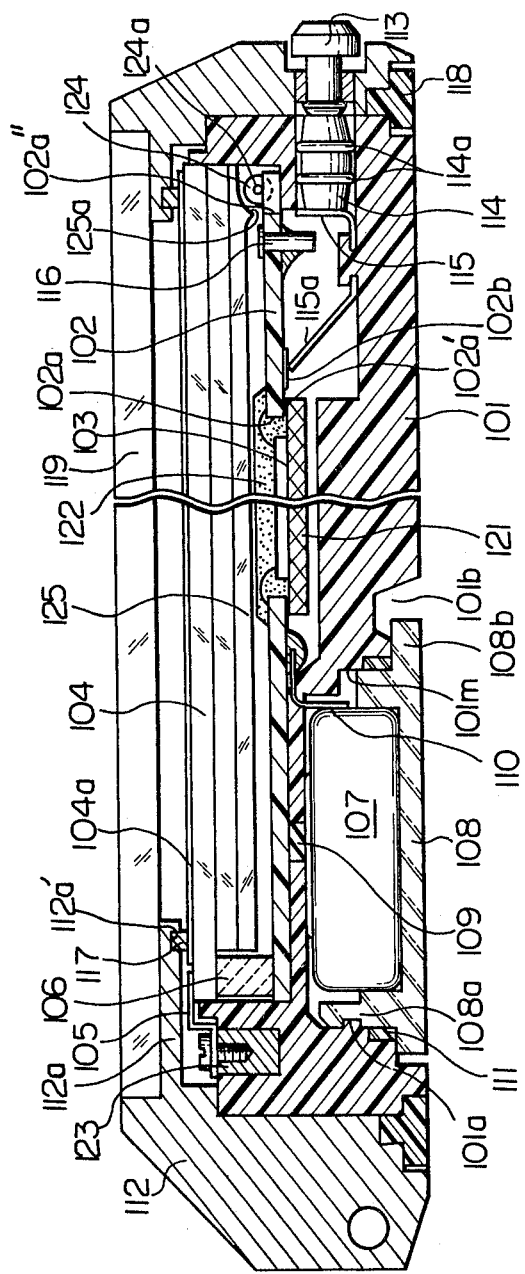
FIG. 2 is a cross sectional view of another preferred embodiment of an electronic timepiece module structure according to the present invention.

Referring now to FIG. 2, there is shown a cross-sectional view of another embodiment of a module structure for an electronic timepiece having a liquid crystal display and provided with a plastic base 101 fabricated by molding a plastic. A circuit board 102 is furnished with a wiring pattern and a small opening 102a into which an IC chip 103 is inserted to reduce the thickness of the module, the circuit board 102 being further provided with a retaining member 121 that is attached thereto by heat caulking. A dummy wiring pattern 102a is formed on the circuit board about the small opening thereof in order to reinforce the bond between the retaining member 121 and the circuit board 102 and prevent the overflow of a potting resin 122. Implanted in the plastic base 101 is a tube 123 the outer periphery of which is knurled to prevent rotation or displacement. A liquid crystal display cell 104 is secured to the plastic base 101 by a restraining member 105 which is fixed in place by a screw screwed into tube 123, and is electrically connected to the wiring pattern on circuit board 102 via a connecting member 106.

A lamp 124 for illuminating the display is inserted into a notch 102a'' formed on the outer periphery of circuit board 102, the lead 124a of the lamp 124 being soldered into place without bending in order to simplify lamp installation. A light transmissive plate 125 at a portion thereof adjacent to the lamp 124 is spherically formed in approximate congruence with the lamp 124 to provide a curved portion to improve the illuminating effect by increasing the quantity of incident light.

The bottom side of the plastic base 101 as depicted in FIG. 2 is formed with a battery accommodating opening 101m for receiving a battery 107 and a plastic battery hatch 108. More specifically, the battery hatch 108 is formed to include a plurality of flexible, plastic nibs 108a which mate with a projecting portion 101a, formed on the side wall of the opening 101m in the base 101, when the hatch 108 is pressed into the base 101. This allows the battery to be retained with sufficient force and brought into contact with the circuit board 102 through springs 109 and 110 which serve as electrode leads. The spring 109 is made of an electrically conductive rubber and serves as a cathode, and spring 110 is made of metal and serves as an anode. The springs 109, 110 can also be installed by insert molding or similar techniques and serve to hermetically seal the inward side of plastic base 101 while providing electrical connection with the wiring pattern of circuit board 102 by coming into pressured contact therewith. To replace the battery 107 a finger nail or screw driver is inserted into a recess 101b formed in the plastic base 101 and is then brought into contact with the collar 108b of the battery hatch, thereby allowing the hatch to be easily pried open so that the battery 107 can be replaced. A waterproof packing 111 is disposed between the battery hatch 108 and plastic base 101.

Attached to watch case 112 are a plurality of external push-buttons 113. Each push-button has a corresponding hole formed in the side wall of the plastic base 101, each hole slidingly accommodating in a loose-fitting but air-tight manner an intermediate switch member 114 comprising an elastic material such as rubber which is capable of furnishing an air-tight seal. The switch member 114 is provided with two symmetrically formed compressible bands 114a for maintaining the air-tight seal and for facilitating the sliding and installation of the switch member. According to this construction, depressing the push-button 113 slides the switch member 114 which in turn deflects a return spring 115 that is secured to the plastic base 101 by heat caulking. Depressing the push-button 113 thus brings the spring 115 into contact with a pin 116 which is implanted in circuit board 102 and connected to the circuit pattern of the circuit board 102. Since the other end 115a of return spring 115 is in pressured contact with an electrode pattern 102b on circuit board 102, contact between the deflected end of the spring 115 and the pin 116 renders the switch closed. Although pin 116 is soldered to the wiring pattern to secure the pin 116 more strongly and promote the pin-to-pattern connection, the end of the return spring 115 that contacts pin 116 is biased away from the direction of contact to provide a sufficient gap between the lump of solder 102b on the wiring pattern and the end of the spring 115 that is deflected. When push-button 113 is released, the restoring force of return spring 115 causes the switch member 114 and push-button 113 to return to their normal positions, thereby opening the switch. The waterproof condition of the push-button portion is therefore maintained by the switch member 114 so that it is unnecessary for the push-button 113 itself to have a waterproof property. This affords a structure which is simpler than that formerly available and which requires fewer parts. This structure also enhances impact resistance since the resiliency of the member 114 absorbs and mitigates shocks sustained by the external portion of the push-button 113.

The movement arranged on the plastic base 101 is installed in the case 112 together with a waterproof packing (not shown) and is secured within the case by the press-fitting of a fixing member 118. The timepiece is made waterproof by packing 111 that waterproof the interfaces between the plastic base 101 and battery hatch 108, and by the switch member 114 that seals the push-button portion. This makes it possible to dispense with the watch case back cover which was required in the prior art, and allows the plastic base 101 to be exposed so that the thickness of the timepiece can be reduced by the thickness of the no longer required back cover. Watch design is not adversely affected since the exposed portion of the plastic base can be furnished with a metallike appearance by a metal plating or similar technique. The size and weight of the timepiece can be even further reduced by using plastic to fabricate the watch case 112.

In FIG. 2, the waterproof structure provides the waterproof packing 117 between the case 112 and an upper polarizing plate 104a which has been processed to increase its hardness. More specifically, the watch case 112 has a radially extending flange 112a having its upper surface adapted to support the watch glass 119 and its lower surface formed with recess 112a' to receive the packing 117. Press fitting the fixing member 118 into the case 112 not only secures the plastic base 101 but also causes compression of the packing 117. With this structure the watchglass 119 need not be secured in a water-tight manner and may even be eliminated under certain conditions to provide a further marked reduction in timepiece thickness.

It is therefor apparent that the module structure of the present invention possesses a number of important advantages. For example, machining precision is extremely high, a waterproof condition can be maintained with a higher degree of reliability since the water-tight seal is provided at the sides of the timepiece module which can be mass produced, costs can be lowered owing to the simpler watch case structure, and timepiece thickness can be reduced since a back cover is no longer necessary.

Figure 3:
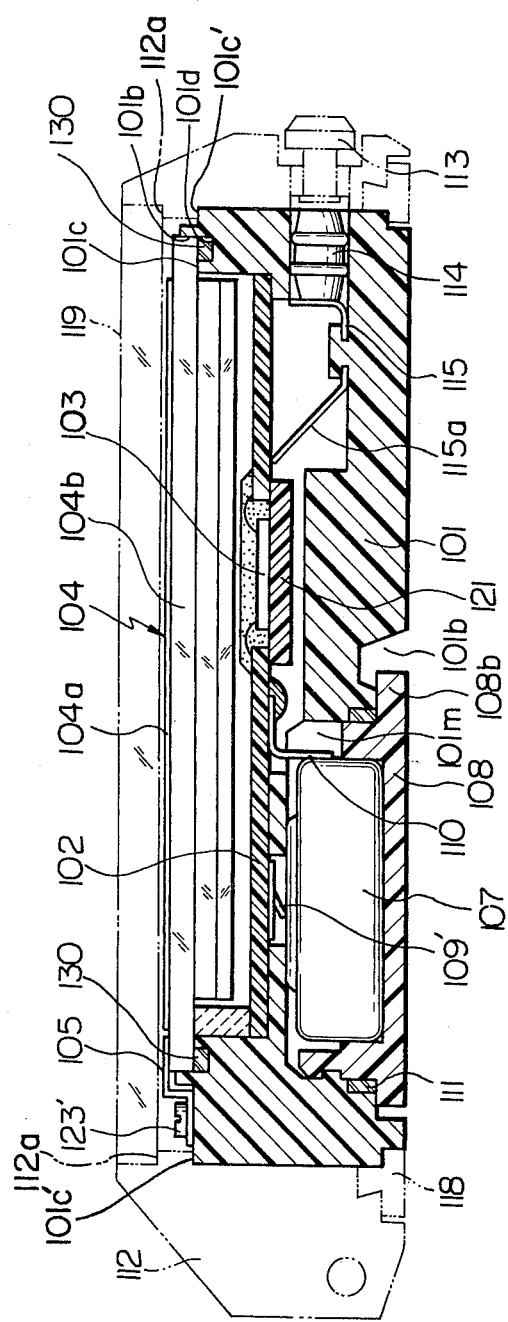
FIG. 3 is a cross sectional view of a modified form of the module structure shown in FIG. 2.

FIG. 3 shows a modified form of a module structure shown in FIG. 2, with like parts bearing the same reference numerals as those used in FIG. 2. In this modification, the plastic base 101 has its upper side formed with an axially extending cell receiving recess 101b, a radially extending of the module structure according to shoulder portion 101c inwardly extending from the cell receiving recess 101b, a radially extending shoulder portion 101c outwardly extending from the cell receiving recess 101b, and a groove 101d formed in the shoulder portion 101c to receive therein a packing 130. The upper glass plate 104b of the display cell 104 is disposed in the cell receiving recess 101b of the plastic base 101 and placed on the shoulder portion 101c. A case body has a radially inwardly extending flange 112a engaging with the shoulder portion 101c' of the plastic base 101. The upper glass plate 104b of the display cell 104 is fixedly retained in place by means of the retaining spring 105 fixed to the plastic base 101 by screw 123'. In this case, the packing 130 is compressed by the lower surface of the upper glass plate 104b of the display cell 104, to provide a waterproofing effect between the upper glass plate 104b and the plastic base 101. Thus, the module structure is made waterproof by the packing 111 disposed between the plastic base 101 and the battery hatch 108, intermediate switch member 114 made of rubber, and the packing 130 disposed between the display cell 104 and the plastic base 101. Indicated at 109' is a spring which provides an electrical connection between the battery 107 and the circuit pattern of the circuit board 102.

Figure 4A:
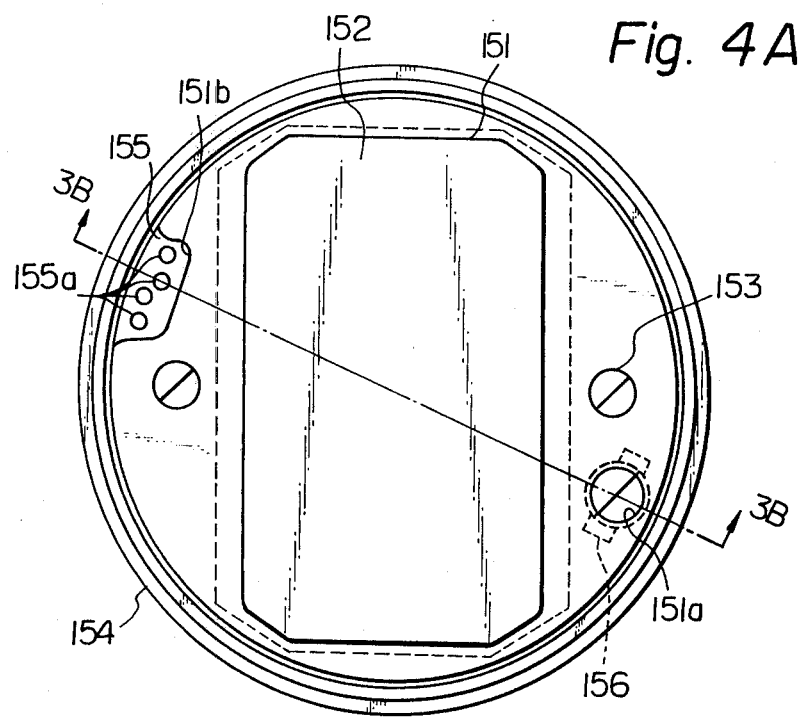
FIGS. 4A and 4B show another preferred embodiment of the watch module structure according to the present invention.
Figure 4B:
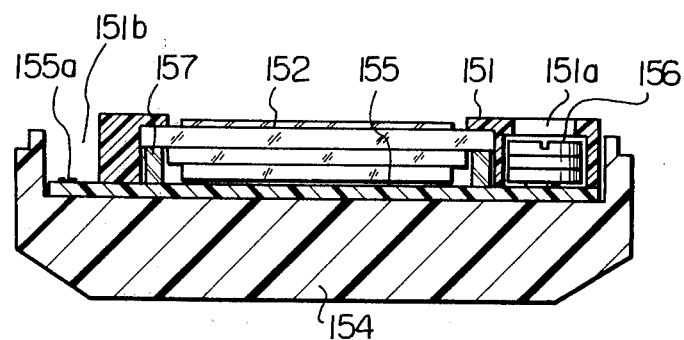

FIGS. 4A and 4B show another preferred embodiment of the module structure according to the present invention. The module structure comprises a plastic base 154 carrying thereon a circuit board 155, a liquid crystal display cell 152 electrically connected to a circuit pattern formed on the circuit board 155 by means of electrically conductive rubber members 157, and a cell retaining frame 151. The cell retaining frame 151 is secured to the plastic base 154 by screws 153 and retains the display cell 152 in a fixed place. The cell retaining frame 151 has an opening 151a formed above a trimming capacitor 156 to allow adjustment of the capacitor 156 through the opening 151a. Also, the cell retaining frame 151 has a cutout 151b formed on the outer periphery of the cell retaining frame 151, to provide a space for a plurality of test terminals 155a formed on an upper surface of the circuit board 155. The test terminals are connected through the circuit pattern on the circuit board 155 to an integrated circuit chip (not shown), to permit testing operation of the integrated circuit chip.

What is claimed is:

1. A module structure for an electronic watch having a case body and a battery, comprising:
   a single body of plastic base serving as a substrate and a back cover of the watch, adapted to be disposed in and supported by a case body, said plastic base having a first axially extending recess formed on one side of said plastic base, and a radial wall portion continuous with said first axially extending recess;
   a circuit board disposed in said first axially extending recess and placed on said radial wall portion, said circuit board supporting an integrated circuit chip and having a printed circuit pattern thereon;
   a liquid crystal display cell disposed on one side of said circuit board opposite said radial wall portion of said plastic base, said display cell including an upper glass plate having rows of printed electrode terminals, and a lower glass plate;
   flexible electrically conductive members disposed between said upper glass plate and said one side of said circuit board to provide electrical connection between said rows of printed electrode terminals and said circuit pattern of said circuit board;
   display cell retaining means for retaining said display cell in a fixed place relative to said circuit board; and
   means for securing said display cell retaining means to the one side of said plastic base.

2. A module structure according to claim 1, in which said plastic base has a second axially extending recess formed on the other side of said plastic base to accommodate said battery, and further comprising a battery hatch fitted to said second axially extending recess.

3. A module structure according to claim 1, in which said case body has a radially extending flange, and in which said display cell retaining means has a shoulder portion engaging with and retained the radially extending flange of said case body.

4. A module structure according to claim 2, in which the integrated circuit chip is mounted on the other side of said circuit board, and in which said plastic base has a cutout axially indented from the radial wall portion of said plastic base to accommodate said integrated circuit chip therein.

5. A module structure according to 2, in which said second axially extending recess is hermetically sealed, and said plastic base has its other side hermetically sealed relative to the one side of said plastic base.

6. A module structure according to claim 5, in which said battery has a negative electrode in contact with a flexible spring contact connected to the printed circuit pattern of said circuit board and a positive electrode in contact with a positive electrode terminal, with said flexible spring contact and said positive electrode terminal being hermetically sealed in said plastic base.

7. A module structure according to claim 5, in which said electronic watch has a push button and in which said plastic base has an axial wall formed with radially extending bore means, and further comprising intermediate switch means hermetically slidable in said radially extending bore means by the action of said push button.

8. A module structure according to claim 7, in which said intermediate switch means is made of a flexible material.

9. A module structure according to claim 8, in which said flexible material is selected from the group consisting of plastic and rubber.

10. A module structure according to claim 1, in which said securing means comprises a plurality of connector tubes embedded in said plastic base and serving as positioning means for positioning said circuit board relative to said plastic base, and screw means screwed into said connector tubes, respectively.

11. A module structure according to claim 5, further comprising a trimming capacitor mounted on the one side of said circuit board, and in which said shoulder portion of said display cell retaining member has an axial bore formed above said trimming capacitor to permit adjustment of said trimming capacitor through said axial bore.

12. A module structure according to claim 11, in which said circuit board has a plurality of testing terminals provided in a predetermined area on the one side of said circuit board, and in which said display cell retaining member has a cutout formed on the same position as said predetermined area.

13. A module structure according to claim 5, in which said battery hatch has a battery accommodating recess formed with a stepped portion, and further comprising a positive electrode plate having its terminal portion disposed between the positive electrode of said battery and said stepped portion of said battery hatch.

14. A module structure according to claim 5, in which said liquid crystal display cell also includes a light transmissive plate disposed below said lower glass plate of the display cell, and a reflecting plate disposed on a bottom surface of said light transmissive plate.

15. A module structure according to claim 14, in which said light transmissive plate has a cutout, and further comprising illuminating lamp means disposed in the cutout of said light transmissive plate.

16. A module structure according to claim 14, in which said light transmissive plate has its bottom surface formed with a curved portion and in which said circuit board has a cutout in close proximity of the curved portion of said light transmissive plate, and further comprising illuminating lamp means partially disposed in the cutout of said circuit board at a position adjacent the curved portion of said light transmissive plate.

17. A module structure according to claim 5, in which said case body has a radially extending shoulder portion and said plastic base has a radially extending shoulder portion engaging the radially extending shoulder portion of said case body.

18. A module structure according to claim 17, further comprising a fixing ring disposed between said case body and said plastic base to retain said plastic base relative to said case body.

19. A module structure according to claim 14, in which said reflecting plate has an area smaller than that of said light transmissive plate.

20. A module structure according to claim 19, in which said light transmissive plate has chamfered edges formed at a lower portion of said light transmissive plate.

21. A module structure according to claim 5, further comprising an elastic seat member disposed between said plastic base and the other side of said circuit board to hermetically seal said second axially extending recess.

22. A module structure according to claim 5, in which said plastic base has a display cell receiving recess in which said upper glass plate of said display cell is disposed, and a shoulder portion formed with a groove, and further comprising a packing disposed in the groove of said plastic base to hermetically seal between said upper glass plate and said shoulder portion.

23. A module structure according to claim 5, in which said case body has a radially extending flange having its lower surface formed with a groove, and further comprising a packing disposed in the groove of said radially extending flange to provide a sealing effect between said radially extending flange and said display cell.

24. A module structure for an electronic watch having a case body and a battery, comprising:
a single body of plastic base serving as a substrate and a back cover of the watch, adapted to be disposed in and supported by a case body, said plastic base having a first axially extending recess formed on one side of said plastic base, a radial wall portion continuous with said first axially extending recess, and said plastic base having a second axially extending recess formed on the other side of said plastic base adapted to accommodate a battery;
a circuit board disposed in said first axially extending recess and placed on said radial wall portion, said circuit board supporting an integrated circuit chip and having a printed circuit pattern electrically connected to said integrated circuit chip thereon;
a liquid crystal display cell disposed on one side of said circuit board opposite said radial wall portion of said plastic base, said display cell including an upper glass plate having rows of printed electrode terminals, and a lower glass plate;
flexible electrically conductive members disposed between said upper glass plate and said one side of said circuit board to provide electrical connection between said rows of printed electrode terminals and said circuit pattern of said circuit board;
a display cell retaining member disposed on the one side of said circuit board; and
means for securing said display cell retaining member to the one side of said plastic base to fixedly retain said display cell on the one side of said circuit board.

25. A module structure according to claim 24, in which said case body has a radially extending flange, and in which said display cell retaining member has a shoulder portion engaging with the radially extending flange of said case body.

26. A module structure according to claim 25, in which the integrated circuit chip is mounted on the other side of said circuit board, and in which said plastic base has a cutout axially indented from the radial wall portion of said plastic base to accommodate said integrated circuit chip therein.

27. A module structure according to claim 26, in which said second axially extending recess is hermetically sealed.

28. A module structure according to claim 27, further comprising a trimming capacitor mounted on the one side of said circuit board, and in which said shoulder portion of said display cell retaining member has an axial bore formed above said trimming capacitor to permit adjustment of said trimming capacitor through said axial bore.

29. A module structure according to claim 28, in which said circuit board has a plurality of testing terminals provided in a predetermined area on the one side of said circuit board, and in which said display cell retaining member has a cutout formed on the same position as said predetermined area.

30. A module structure according to claim 24, further comprising a fixing ring disposed between said case body and said plastic base to retain said plastic base relative to said case body.

31. An electronic wristwatch powered by a battery, comprising, in combination:
a case body having an axially extending inner wall and a radially inwardly extending flange formed above said inner wall;
a single body of plastic base serving as a substrate and a back cover of the watch, said plastic base having its one side engaging with the flange of said case body and an outer periphery engaging with the inner wall of said case body, said plastic base having a first axially extending recess formed on the one side of said plastic base, a radial wall portion continuous with said first axially extending recess, and a second axially extending recess formed on the other side of said plastic base to accommodate said battery;
a circuit board disposed in said first axially extending recess and placed on said radial wall portion, said circuit board supporting an integrated circuit chip and having a printed circuit pattern electrically connected to said integrated circuit chip thereon;
a liquid crystal display cell disposed on one side of said circuit board opposite said radial wall portion of said plastic base, said display cell including an upper glass plate having rows of printed electrode terminals, and a lower glass plate;
flexible electrically conductive members disposed between said upper glass plate and said one side of said circuit board to provide electrical connection between said rows of printed electrode terminals and said circuit pattern of said circuit board;
display cell retaining member disposed on the one side of said circuit board; and
means for securing said display cell retaining member to the one side of said plastic base to fixedly retain said display cell on the one side of said circuit board.

32. An electronic wristwatch according to claim 31, further comprising a packing disposed between a lower portion of the outer periphery of said plastic base and a lower portion of said axially extending inner wall of said case body to hermetically seal between said plastic base and said axially extending inner wall of said case body.

33. An electronic wristwatch according to claim 32, further comprising a second packing disposed between an upper portion of the outer periphery of said plastic base and an upper portion of said axially extending inner wall of said case body to hermetically seal between said plastic base and said axially extending inner wall of said case body.

34. An electronic wristwatch according to claim 31, in which said case body has a radially inwardly extending flange having its lower surface formed with an annular recessed portion facing said display cell, and further comprising a packing disposed between said recessed portion and said display cell to hermetically seal between said radially inwardly extending flange portion and said display cell.

35. An electronic wristwatch according to claim 31, further comprising a battery hatch fitted to said second axially extending recess of said plastic base.

36. An electronic wristwatch according to claim 31, in which said display cell retaining member has a shoulder portion engaging with and the radially inwardly extending flange of said case body.

37. An electronic wristwatch according to claim 31, in which said integrated circuit chip is mounted on the other side of said circuit board, and in which said plastic base has a cutout axially indented from said radial wall portion of said plastic base to accommodate said integrated circuit chip therein.

38. An electronic wristwatch according to claim 35, in which said second axially extending recess is hermetically sealed.

39. An electronic wristwatch according to claim 38, in which said battery has a negative electrode in contact with a flexible spring contact connected to the printed circuit pattern of said circuit board and a positive electrode in contact with a positive electrode terminal, with said flexible spring contact and said positive electrode terminal being hermetically sealed in said plastic base.

40. An electronic wristwatch according to claim 38, in which said electronic wristwatch has a push button and in which said plastic base has an axial wall formed with radially extending bore means, and further comprising intermediate switch means hermetically slidable in said radially extending bore means by the action of said push button.

41. An electronic wristwatch according to claim 40, in which said intermediate switch means is made of a flexible material.

42. An electronic wristwatch according to claim 41, in which said flexible material is selected from the group consisting of plastic and rubber.

43. An electronic wristwatch according to claim 31, in which said securing means comprises a plurality of connector tubes embedded in said plastic base and serving as positioning means for positioning said circuit board relative to said plastic base, and screw means screwed into said connector tubes, respectively.

44. An electronic wristwatch according to claim 36, further comprising a trimming capacitor mounted on the one side of said circuit board, and in which said shoulder portion of said display cell retaining member has an axial bore formed above said trimming capacitor to permit adjustment of said trimming capacitor through said axial bore.

45. An electronic wristwatch according to claim 43, in which said circuit board has a plurality of testing terminals provided in a predetermined area on the one side of said circuit board, and in which said display cell retaining member has a cutout formed on the same position as said predetermined area.

46. An electronic wristwatch according to claim 35, in which said battery hatch has a battery accommodating recess formed with a stepped portion, and further comprising a positive electrode plate having its terminal portion disposed between the positive electrode of said battery and said stepped portion of said battery hatch.

47. An electronic wristwatch according to claim 31, in which said liquid crystal display cell also includes a light transmissive plate disposed below said lower glass plate of said display cell, and a reflecting plate disposed on a bottom surface of said light transmissive plate.

48. An electronic wristwatch according to claim 47, in which said light transmissive plate has a cutout, and further comprising illuminating lamp means disposed in the cutout of said light transmissive plate.

49. An electronic wristwatch according to claim 47, in which said light transmissive plate has its bottom surface formed with a curved portion and in which said circuit board has a cutout of close proximity of the curved portion of said light transmissive plate, and further comprising illuminating lamp means partially disposed in the cutout of said circuit board at a position adjacent the curved portion of said light transmissive plate.

50. An electronic wristwatch according to claim 47, in which said reflecting plate has an area smaller than that of said light transmissive plate.

51. An electronic wristwatch according to claim 50, in which said light transmissive plate has chamfered edges formed at a lower portion of said light transmissive plate.

52. An electronic wristwatch according to claim 35, further comprising an elastic seat member disposed between said plastic base and the other side of said circuit board to hermetically seal said second axially extending recess.

53. An electronic wristwatch according to claim 31, in which said plastic base has a display cell receiving recess in which said upper glass plate of said display cell is disposed.

* * * * *